United States Patent [19]

Bratton

[11] Patent Number: 4,495,932
[45] Date of Patent: Jan. 29, 1985

[54] FOOD STEAM HEATING APPARATUS

[75] Inventor: Ronald E. Bratton, Fort Wayne, Ind.

[73] Assignee: Lincoln Manufacturing Company, Inc., Fort Wayne, Ind.

[21] Appl. No.: 231,249

[22] Filed: Feb. 3, 1981

[51] Int. Cl.³ ............................................. A21B 1/36
[52] U.S. Cl. ...................................... 126/20; 99/467; 99/481; 99/483
[58] Field of Search ............. 99/467, 474, 483, 516, 99/417, 294, 295, 470, 481; 122/476, 487; 126/20, 369

[56] References Cited

U.S. PATENT DOCUMENTS

| | | | |
|---|---|---|---|
| 369,836 | 9/1887 | Blackman | 99/467 X |
| 1,349,130 | 8/1920 | Hadaway . | |
| 2,617,349 | 11/1952 | Tucker | 99/483 |
| 2,636,969 | 4/1953 | Lewis . | |
| 2,717,556 | 9/1955 | Bartoo | 92/92 |
| 3,039,399 | 12/1959 | Everett | 103/150 |
| 3,069,994 | 7/1959 | Lewis | 99/234 |
| 3,191,518 | 6/1965 | Pavelka | 99/234 |
| 3,320,945 | 11/1967 | Dunkleman | 126/369 |
| 3,447,479 | 6/1967 | Rosenberg | 103/153 |
| 3,502,065 | 5/1968 | Lassiter . | |
| 3,735,749 | 5/1973 | Binks et al. | 99/474 X |
| 3,794,016 | 2/1974 | Binks et al. | 126/369 |
| 3,814,901 | 6/1974 | Morhack | 219/401 |
| 3,820,524 | 6/1974 | Buckell . | |
| 3,902,044 | 8/1975 | Doyle et al. | 219/284 |
| 3,975,119 | 9/1976 | Farris | 417/434 |
| 4,123,969 | 11/1978 | Abbate | 99/467 |

FOREIGN PATENT DOCUMENTS

| | | | |
|---|---|---|---|
| 0929369 | 7/1973 | Canada | 99/467 |
| 50-10944 | 7/1976 | Japan | 99/467 |
| 2329 | of 1908 | United Kingdom | 99/467 |
| 1359294 | 7/1974 | United Kingdom | 99/483 |

Primary Examiner—Philip R. Coe
Assistant Examiner—Christine Peterson
Attorney, Agent, or Firm—Albert L. Jeffers; John F. Hoffman

[57] ABSTRACT

A steam heating unit for heating and freshening food products having a food compartment enclosed by a pivoted cover or lid and a heat exchanger assembly for generating and superheating a charge of steam. The heat exchanger assembly comprises a heater plate having an electric resistance heating element therein and a heater plate cover disposed over the heater plate. The heater plate cover includes a plurality of ribs or barriers which form with the heater plate a steam generating chamber and a pair of steam superheating chambers. A charge of water is directed onto the heater plate upper surface, which converts the water to steam that then passes through a pair of throttling passages into the superheating chambers. In the superheating chambers, the steam is dried and superheated and then flows through a plurality of passages into the food compartment where it heats the food contained therein and imparts a limited amount of moisture to freshen it. The charge of water is drawn from a water storage tank contained within the unit by means of a double duckbill valve pump, which is actuated manually.

18 Claims, 13 Drawing Figures

FOOD STEAM HEATING APPARATUS

BACKGROUND OF THE INVENTION

The present invention relates to a steam heating device, and in particular to a device of this type which utilized for heating foods, especially those which are precooked and only require heating or freshening before they are served.

Many foods, such as hamburger buns, dinner rolls and the like, lose their freshness quite rapidly after they are baked. Since many restaurants, particularly fast food establishments, do not bake their rolls and breads on the premises, but purchase them in large quantities from independent bakeries, such bread products must be stored for several days before they are served. The bread products, even though they may be stored in relatively airtight wrappers, lose some of their moisture thereby acquiring a dry texture and stale taste.

It has been found that by subjecting breadstuffs, such as rolls, buns and pastries, to a blast of superheated steam, the food product is rapidly heated and much of its lost moisture restored so that it has a fresher taste. Many foods other than bread products can also be heated by steam, including those foods which are precooked and then frozen.

Typically, prior art food steamers comprise a closed compartment within which the food is contained, and steam is injected into the compartment through a plurality of orifices located either above or below the food. The steam is usually generated by injecting water onto the surface of a heated plate, which quickly heats the water to 212° F. thereby converting it to steam. The steam is then passed through passages into a second chamber which is formed by at least one plate in thermal contact with the first-mentioned plate and which superheats the steam thereby raising its temperature above 212°. From the superheating chamber, the steam travels through passages to the food compartment.

Many of the prior art food steamers of this type are formed with the steam generating chamber in the lower part of the unit and one or more steam superheating chambers stacked above the steam generating chamber. This results in a unit which is relatively large and bulky thereby occupying space which may be at a premium, particularly in fast food restaurants which are likely to have small food preparation areas. A further disadvantage to the stacked plate arrangement is that thermal conduction from one plate to the other may be poor. In most units, the heating elements are provided in only one plate, either the steam generating or steam superheating plate, and the plate which does not contain the elements may not attain a sufficiently high temperature to function properly. For example, if the heating elements are disposed in the steam superheating plate, which is typically positioned above the steam generating chamber, there may not be sufficient thermal conduction between the superheating plate and the lower plate forming the steam generating chamber to rapidly convert the water sprayed thereon to steam. If this arrangement is reversed and the heating elements are located in the lower, steam generating plate, the steam superheating plate may not become hot enough to superheat the steam to the desired temperature.

A still further disadvantage to the stacked plate arrangement is that there is a relatively large thermal mass, which requires long warmup times and radiates large amounts of heat to the ambient.

Although steam heating devices not employing the stacked plate arrangement are known, such as that disclosed in U.S. Pat. No. 3,794,016, their construction is such that superheating of the steam is not accomplished satisfactorily. In most prior art units, the steam is not superheated to a sufficiently high temperature and the moisture content of the steam, therefore, is quite high. In the case of bread products, the high moisture content of the steam imparts a wet film to the product, which is very undesirable. A further advantage to the use of steam which is superheated to a high temperature is that it heats the food more quickly.

SUMMARY OF THE INVENTION

The above-discussed problems and disadvantages of prior art food steamers are overcome by the present invention which is compact in size yet it is capable of superheating the steam to a relatively high temperature, thereby enabling heating of foods rapidly and avoiding imparting too much moisture to them. The heat exchanger for the apparatus comprises two vertically disposed plates which form between them a plurality of chambers and passages. A relatively large steam generating chamber is formed centrally within the heat exchanger and is connected to two superheated chambers positioned laterally thereof through a pair of tapered throttling passages. The steam is generated in the steam generating chamber by directing a charge of water onto the heated surface of the lower plate, which is heated to a temperature of 360° F., for example. The steam is forced through the tapered throttling passages whereupon the velocity of the steam increases. The steam then enters the superheating chambers which have a larger cross-sectional flow area than the throttling passages thereby causing the steam to expand slightly. The cross-sectional flow area is the effective cross-sectional area which the steam encounters as it flows from one point to another.

By causing the steam to expand in the superheating chambers, it comes into contact with a large, heated surface area in a relatively short time thereby raising the temperature of the steam to a level substantially above that in the steam generating chamber. For example, the steam in the superheating chamber may be raised to approximately 280° F. From the steam superheating chambers, the steam flows through vertical passages and out through orifices in the food compartment with a relatively high velocity. The orifices are located in an upstanding lip within the food compartment and are directed generally horizontally so that grease and particles of food do not tend to lodge therein, which could block the flow of steam.

The food compartment is located directly above the heat exchanger so that the rising heat from the heat exchanger will tend to maintain the temperature of the food compartment at a high level. This prevents rapid cooling of the steam as it enters the food compartment and enables the food to be heated quickly.

Water is pumped from a storage tank within the unit into the steam generating chamber by means of a double duckbill valve pump. The duckbill valves are connected in series with one valve leading from the storage tank to an expansible chamber and the other duckbill valve leading from the expansible chamber through a tube and into the steam generating chamber. The expansible chamber is expanded and contracted by means of bellows, which are operated by an actuator button protruding out of the unit cabinet. When the bellows are compressed, water within the expansible chamber is forced out of the duckbill check valve which is connected to the connecting tube, and as the bellows expand under the force of a return spring, a charge of water is drawn out of the storage tank through the other duckbill valve and into the expansible chamber.

Specifically, the present invention contemplates a steam heating device for heating and freshening foodstuffs comprising a cabinet, a heat exchanger assembly mounted in the cabinet and a lid connected to the cabinet and enclosing the upper surface of the heat exchanger assembly to form therewith a food compartment adapted for receiving foodstuff to be heated. The heat exchanger assembly includes a steam generating chamber below the food compartment, means below the chamber for heating the lower surface thereof, and a nozzle for directing water into the chamber on the lower surface thereof. The exchanger assembly further includes a steam superheating chamber coplanar with and of a smaller volume than the steam generating chamber and being connected to the generating chamber through a throttling passage having a cross-sectional flow area less than the cross-sectional flow areas of the superheating chamber and steam generating chamber whereby the steam increases in velocity as it enters the throttling passage from the steam generating chamber and then expands upon entering the superheating chamber. A plurality of small outlet passages are provided in the heat exchange assembly in communication with the superheating chamber and opening into the food compartment whereby superheated steam is introduced into the food compartment to heat and freshen the foodstuff therein.

The steam heating device in accordance with another aspect of the invention includes a cabinet, a heat exchanger assembly mounted in the cabinet and having an upper surface, a lid connected to the cabinet and enclosing the heat exchanger surface to form a food warming cabinet, and a water supply tank. The heat exchanger assembly includes a steam generating chamber and a steam superheating chamber connected thereto and steam passages connecting the superheating chamber with the food heating compartment. A water nozzle is connected to the heat exchanger assembly and opens into the steam generating chamber. The improvement is a pump interposed between the tank and nozzle comprising a pump body having an inlet connected to the tank and an outlet connected to the nozzle, an expansible chamber interposed between the inlet and outlet, a first duckbill check valve received in the pump body and interposed between the inlet and expansible chamber, and a second duckbill check valve received in the pump body and interposed between the expansible chamber and the outlet, the valves being connected in series.

It is an object of the present invention to provide a steam heating device for foodstuffs which is streamlined and compact and has a low vertical profile.

A further object of the present invention is to provide a steam heating device which produces high temperature and low moisture superheated steam which is capable of quickly heating foods, such as bread products, without causing them to become soggy.

A still further object of the present invention is to provide a steam heating device which is more thermally efficient than prior art devices, and which can be heated up to operating temperatures in a short period of time.

These and other objects of the present invention will be apparent from the detailed description of a preferred embodiment considered together with the appropriate drawing figures.

DESCRIPTION OF THE PREFERRED EMBODIMENT

Figure 1:
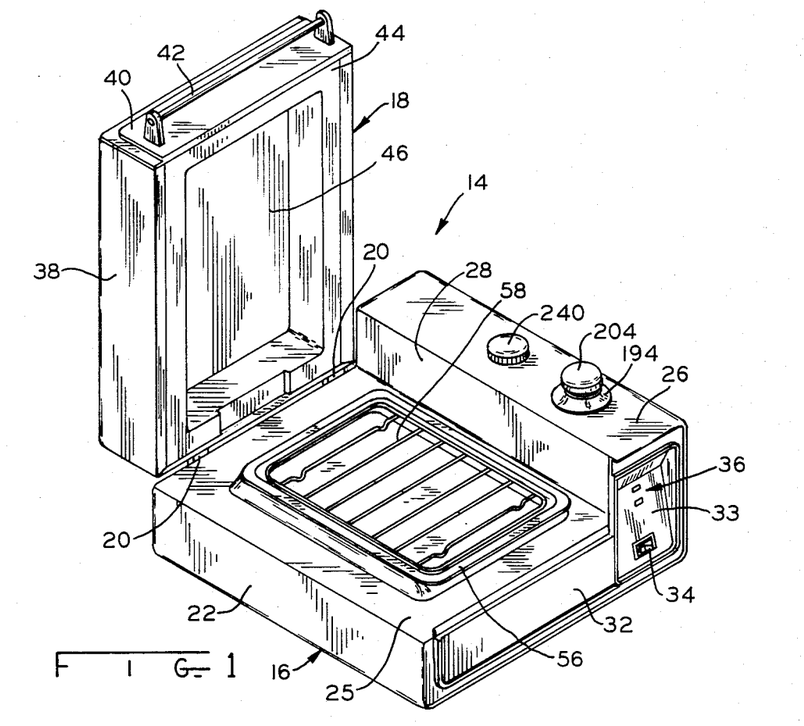
FIG. 1 is a perspective view of the steam heating device according to the present invention.
Figure 2:
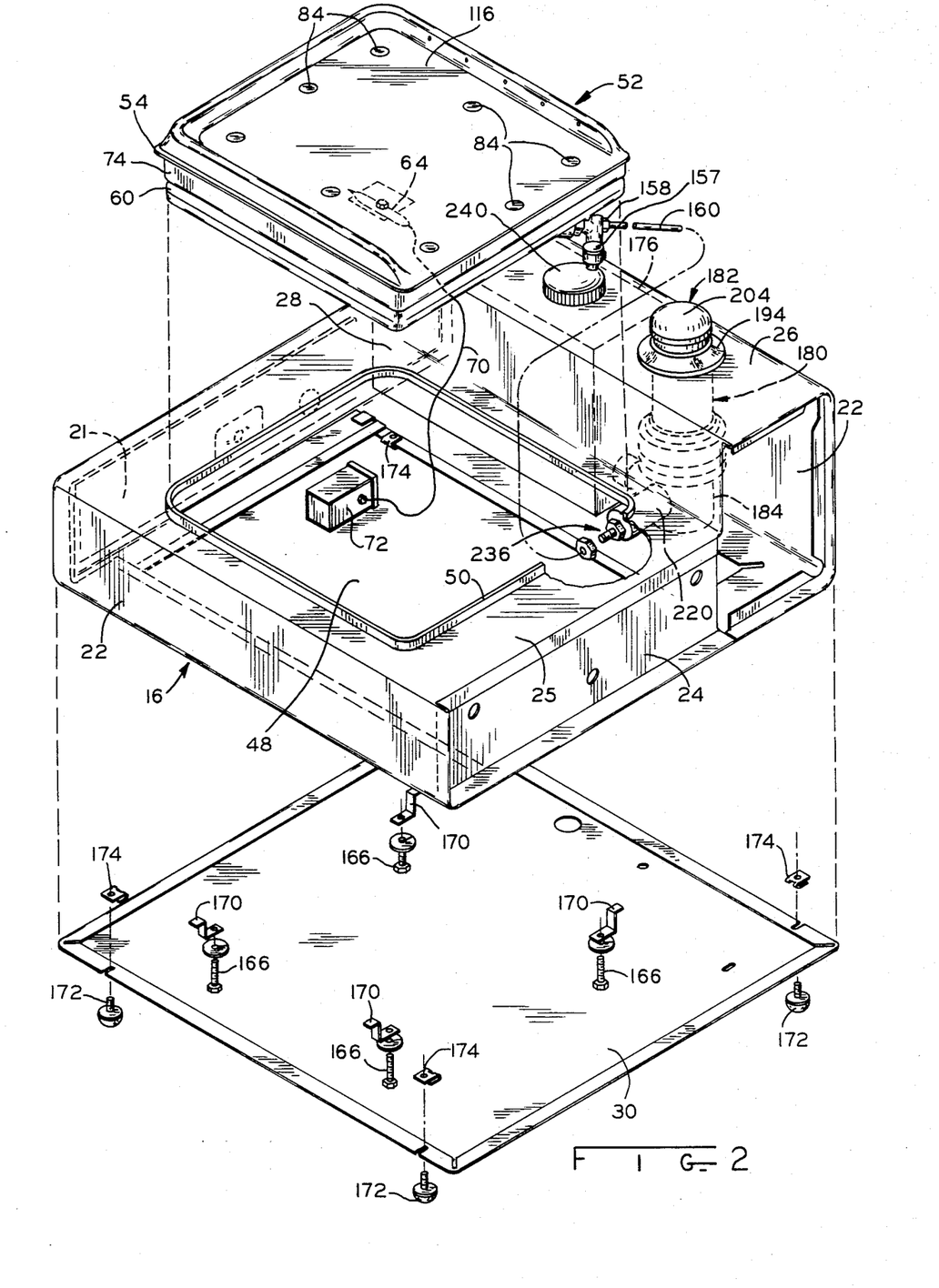
FIG. 2 is an exploded perspective view of the device with the cover and front panels removed.

Referring now in detail to the drawings, FIG. 1 shows the complete heating unit 14 which comprises a stainless steel cabinet 16 and a lid 18 connected to cabinet 16 by hinges 20 connected to the rear panel 21 (FIG. 2). With reference to FIG. 2, cabinet 16 comprises side panels 22, rear panel 21, front panel 24, upper panels 25 and 26, a side panel 28 extending above upper panel 25, and a bottom 30. As shown, cabinet 16 is made of a number of individual plates bent to shape and connected together by any suitable means, such as seaming or welding. Decorative panels 32 and 33 are connected to the front of the cabinet 16, and it will be seen that panel 33 includes openings for off-on switch 34 and indicator lights 36.

Lid 18 comprises a stainless steel outer shell 38 having a front plate 40 and handle 42 connected thereto. An aluminum inner shell 44 is connected to outer shell 38 and includes an enlarged recess 46 therein, which forms a portion of the food compartment when lid 38 is pivoted to its closed position (not shown).

The upper panel 25 of cabinet 16 has a large, rectangular opening 48 therein having an upstanding lip enclosed by a U-shaped silicone rubber gasket 50 (FIG. 2). Heat exchanger assembly 52 is received within opening 48 and includes a rectangular flange 54 which is supported on gasket 50. A suitable tray 56 is supported on heat exchanger 52 and a metal rack 58 is received within tray 56. Rack 58 is adapted to support the food product, such as a bun, pastry, meat patty or the like, away from tray 56 so that the steam can reach all surfaces thereof. Tray 56 is removable and is adapted to catch drippings from the food so that they can be disposed of.

Figures 5, 6, 7, 8:
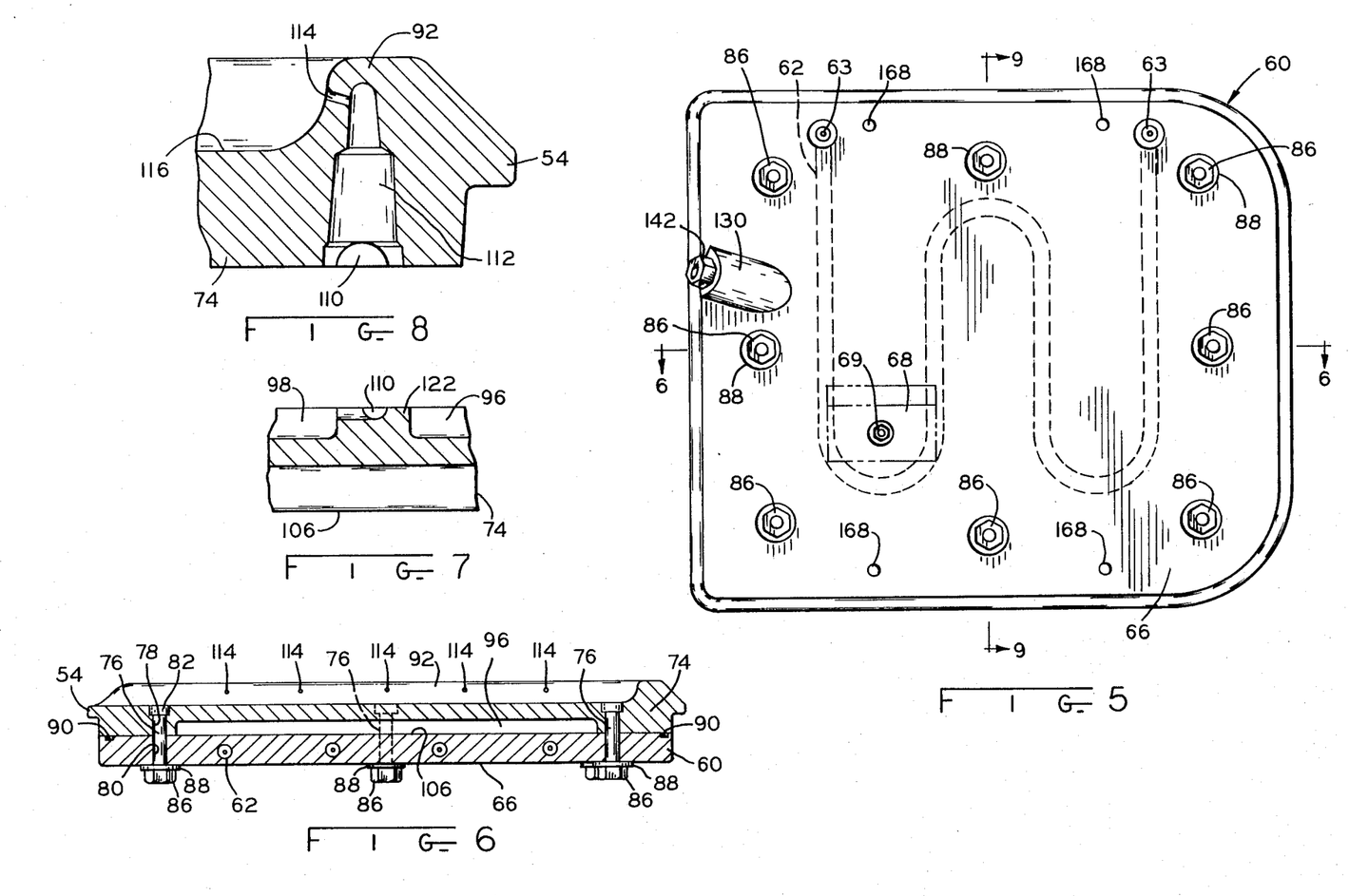
FIG. 5 is a bottom view of the heater plate.
FIG. 6 is a sectional view taken along line 6—6 of FIG. 5 and viewed in the direction of the arrows.
FIG. 7 is an enlarged sectional view taken alone line 7—7 of FIG. 3 and viewed in the direction of the arrows.
FIG. 8 is an enlarged sectional view of the edge portion of the heater plate cover.

With particular reference now to FIGS. 5–9, the heat exchanger assembly 52 will be described in detail. It comprises a cast aluminum heater plate 60 (FIG. 5)

having a conventional electric resistance heating element 62 embedded therein and including terminals 63. A thermal sensor bulb 64 (FIG. 2) is attached to the lower surface 66 of heater plate 60 by means of a bracket 68 and screw 69. An electric wire 70 connects sensor 64 with a thermostat control contained within box 72.

Figure 4:
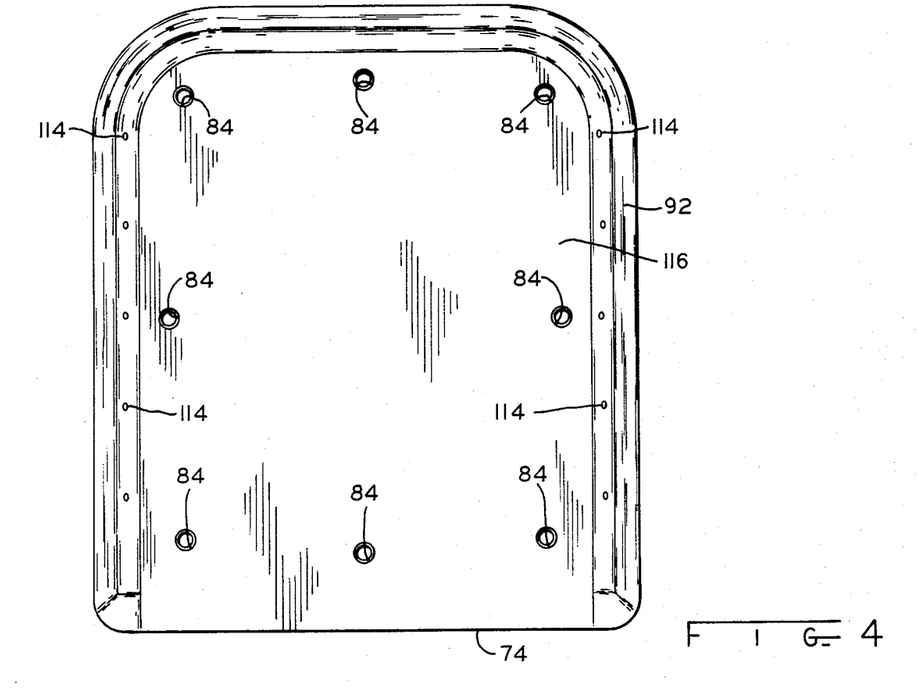
FIG. 4 is a top plan view of the heater plate cover.

Heat exchanger assembly 52 further comprises a heater plate cover 74, also made of cast aluminum, connected in overlying fashion to heater plate 60 by means of screws 76 which pass through openings 78 and 80 in heater plate cover 74 and heater plate 60, respectively. The heads 82 of screws 76 are received within recesses 84 (FIG. 4) in cover 74 and are secured by means of nuts 86 and washers 88 tightened against the lower surface 66 of heater plate 60. A silicone rubber seal 90 is received within a groove in heater plate 60 which extends completely around the periphery thereof. Heater plate cover 74 includes a flange 54 which enables it to be supported on the upper panel 24 of cabinet 16 and includes an upstanding lip 92 extending around three sides thereof, and which is shaped to receive tray 56 as illustrated in FIG. 1. Because lip 92 extends only around three sides, tray 56 can easily be slid in and out of position.

Figure 3:
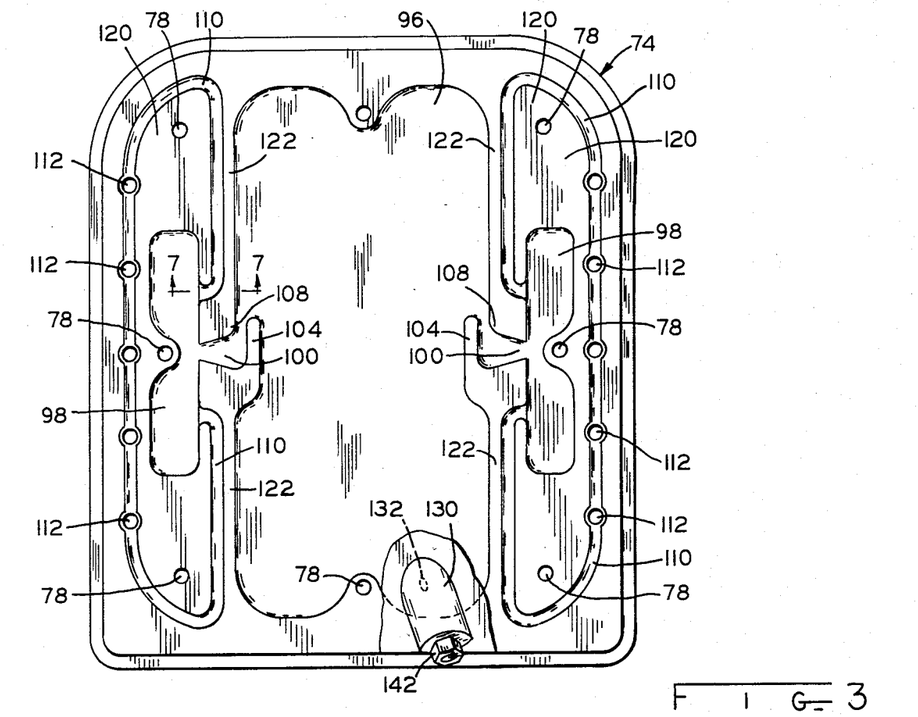
FIG. 3 is a bottom view of the heater plate cover.
Figure 9:
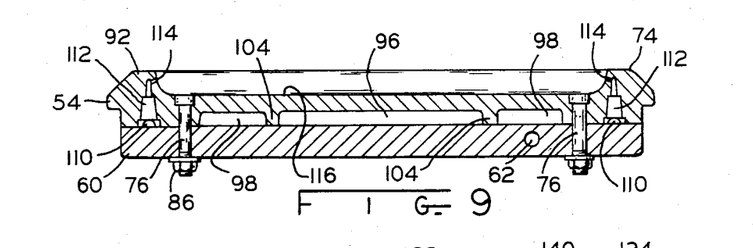
FIG. 9 is a sectional view taken along line 9—9 of FIG. 5 and viewed in the direction of the arrows.

With particular reference now to FIG. 3, the contour of the underneath side of heater plate cover 74 will be described. It comprises, when assembled with heater plate 60 as shown in FIGS. 6 and 9, a relatively large area steam generating chamber 96 and two steam superheating chambers 98 positioned on both sides of steam generating chamber 96. It will be noted that chambers 96 and 98 are essentially coplanar, thereby resulting in a relatively flat heat exchanger assembly, as opposed to prior art steam heating devices of this type wherein the steam geneating and superheating chambers were vertically spaced. Steam generating chamber 96 communicates with superheating chambers 98 through tapered throttling passages 100, which are shielded from the water orifice 102 by barriers 104.

When water is sprayed onto the upper surface 106 of heater plate 60, superheated steam forms underneath the water droplets and causes them to skip and bounce around within steam generating chamber 96. If these droplets were to be sprayed on the food before they have turned to steam, they would cause the food to become soggy. In order to prevent this, barriers 104 are positioned such that they block any water bubbles from passing directly through throttling passages 100 without first striking a heated separating wall of heater plate cover 74. It will be noted that they extend in a direction away from inlet orifice 132 and past the corners 108 of the walls forming throttling passages 100 a sufficient distance to avoid a straight path from chamber 96 into superheating chambers 98. These somewhat tortuous passages formed by barrier 104 increase the probability that all of the water droplets will be converted to steam before entering superheating chambers 98.

The cross-sectional flow area of each of superheating chambers 98, which is the apparent cross-sectional area for steam flowing through the chambers 98, is greater than the cross-sectional areas of throttling passages 100. This causes the steam to expand somewhat as it enters chambers 98 through throttling passages 100, thereby decreasing the velocity of the steam and increasing the residence time within superheating chambers 98. This assists in raising the temperature of the steam to approximately 280° F. From superheating chambers 98, the steam flows through elongated connecting passages 110. Since passages 110 are of a substantially smaller cross-sectional flow area than superheating chambers 98, the velocity of the steam will increase as it flows through passages 110 and up through outlet passages 112. There are ten outlet passages 112 provided, and each of them connects with a relatively small orifice 114 extending through the upper lip 92 of heater plate cover 74 into the food compartment formed between cover liner 46 and the upper surface 116 of heater plate cover 74. By providing orifices 114 on the side walls of lip 92, grease and particles of food are less likely to become lodged therein, as in the case of many prior art steam heating devices wherein the orifices are located in the lower surface of the food compartment. Furthermore, by angling orifices 114 slightly upward, the steam is directed against the cover liner 46 and causes more even distribution thereof. There is sufficient clearance between tray 56 and lip 92 to permit the steam emitting from orifices 114 to pass.

Heater plate cover 74 is cast into the shape shown, and comprises web portions 120 that are in sealing engagement with the upper surface 106 of heater plate 60 and separate superheating chamber 98 from connecting passages 100. Web portions 122 are similarly in contact with the upper surface 106 of heater plate 60 and separate superheating chambers 98 and passages 110 from the main steam generating chamber 96. Rather than casting heater plate cover 74 in the form shown, it could be cast as a solid block and chambers 96 and 98 and passages 100, 110 and 112 could be machined therein.

Figures 12, 13:
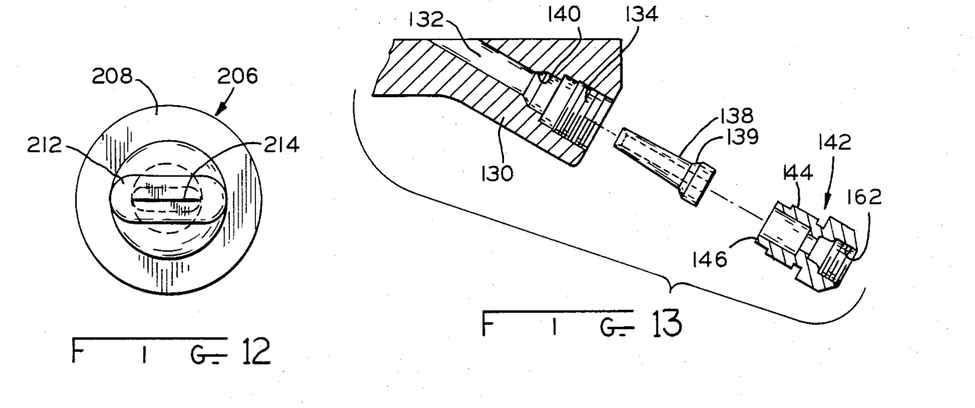
FIG. 12 is a front end view of one of the valves.
FIG. 13 is a sectional exploded view showing the nozzle assembly and heater plate.

With reference to FIG. 13, heater plate 60 has an enlarged inlet portion 130 having a water inlet passage 132 and a threaded socket 134 machined therein. A nozzle 138 is received within passage 132 with the tapered shoulder 139 thereof seating against the corresponding tapered shoulder 140 within passage 132. Locknut 142 comprising threads 144 is threaded into socket 134 and its edge 146 engages nozzle 138 to retain it tightly within passage 132. A relief valve 157 is connected to socket 162 and standard compression fitting 158 (FIG. 2) connects polyethylene tube 160 to valve 157.

The heat exchanger assembly 162 is held in place by means of screws 166 that extend through openings in the bottom 30 of cabinet 16 and are threaddedly receive within holes 168 in heater plate 60 (FIG. 5). The weight of heat exchanger 52 is supported on brackets 170 that are secured to bottom 30 by screws 166, and rubber mounting feet 172 are connected to bottom panel 30 by clips 174.

Figures 10, 11:
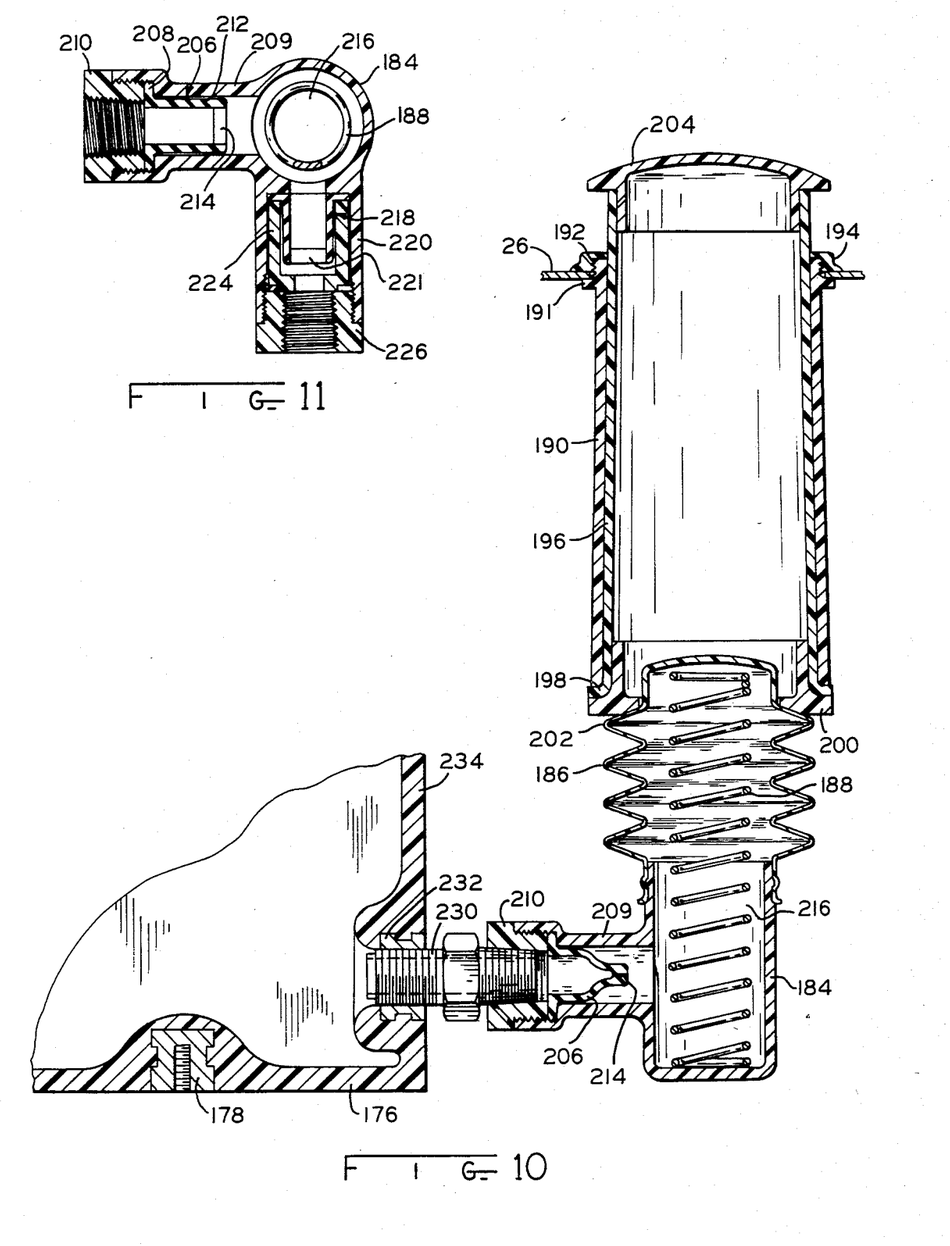
FIG. 10 is a longitudinal sectional view of the pump and a portion of the water tank.
FIG. 11 is a transverse sectional view of the pump.

With reference now to FIGS. 2, 10 and 11, the water supply for the unit is contained within a polyethylene storage tank 176 mounted within cabinet 16 by mounting inserts 178. Bellows pump 180 is connected to tank 176 and to water line 160, and functions to inject a small quantity of water into steam generating chamber 96 when the pump button 182 is manually pressed by the person operating the unit. Pump 180 is received within the compartment of cabinet 16 within which water tank 176 is mounted. Pump 180 comprises a pump body 184 supported on the bottom 30 of cabinet 16 and having a bellows 186 connected thereto and urged to its expanded condition (FIG. 10) by spring 188. A tubular and slightly tapered collar 190 comprising a flange 191 and threads 192 extends through an opening in the upper panel 26 of cabinet 16 and is secured thereto by threaded locking collar 194. A correspondingly tapered and tubular pump actuator 196 is slidably received within collar 190 and includes a flange 198 on its lower end. Bellows collar 200 is adhesively secured to the lower end of pump actuator 196 and rests on the uppermost fold 202 of bellows 186. Pump button 204 is adhesively secured to the upper end of pump actuator 196. When pump button 204 is depressed, bellows 186 will be contracted, and when button 204 is released, the return spring 188 causes bellows 186 to return to its expanded position shown in FIG. 10.

An intake duckbill check valve 206 made of rubber and comprising a flange 208 is received within one leg 209 of pump body 184 and clamped therein by threaded reducing bushing 210. Duckbill check valve 206 has a slightly elongated flattened shank portion 212 with a slit 214 in the end thereof (FIG. 12). In this type of valve, slit 214 opens when the fluid pressure within shank portion 212 is higher than that beyond the slit 214, and closes when the pressure conditions are reversed. Accordingly, as bellows 186 is expanding, slit 214 will open and draw water within the expansible chamber 216.

A similar duckbill check valve 218 is received within the other leg 220 of pump body 184 and oriented such that its slit 221 faces in the same flow direction as that of valve 206. The valves 206 and 218, therefore, are connected serially. Valve 218 is clamped within leg 220 by spacer 224 and threaded reducing bushing 226. The slit 221 in valve 218 opens when bellows 186 are depressed and closes when bellows 186 is expanded by spring 188.

Pump 184 is connected to the water supply tank 176 by means of coupling 230, which is threaded to reducing bushing 210 and to an internally threaded insert 232 in the sidewall 234 of tank 176. Water line 160 is connected to reducing bushing 226 by means of a conventional compression fitting 236 (FIG. 2). The neck of water supply tank 175 extends through the upper panel 26 of cabinet 16 and is closed by means of filler cap 240 (FIG. 1).

In operation, the unit is turned on by actuating switch 34 (FIG. 4), which causes electric current to flow through heating element 62 and heat heater plate 60 to the temperature of approximately 360° F. Because the heater plate cover 74 is tightly clamped to heater plate 60, it too will become heated to approximately the same temperature. Lid 18 is opened and the food product, such as a roll, bun or pastry, is placed on rack 58, and cover 18 is then closed.

The operator then depresses pump actuator button 204 thereby compressing bellows 186 and causing the charge of water within expansible chamber 216 to be ejected through duckbill valve 218. Because of the increase in pressure in chamber 216, the other duckbill valve 206 will be closed. The pressurized water within waterline 160 discharges through nozzle 136 (FIG. 13) into chamber 96. When button 204 is released, spring 188 will cause bellows 186 to expand thereby closing valve 218 and drawing in a new charge of water through open valve 206.

The water which is injected into steam generating chamber 96 strikes the heated surfaces of plates 60 and 74, and is turned to steam. The steam travels through throttling chambers 100 where its velocity increases and then expands into superheating chambers 98. The steam within chambers 98 is further heated to the temperature of approximately 280° F., and it travels through connecting passages 110, up through outlet passages 112, and out through orifices 114 into the food compartment formed by the lower cover 18. The steam completely surrounds the food product within the food compartment thereby raising its temperature and imparting a limited amount of moisture to it. The lid 18 is then raised and the food product is removed for serving.

Although the unit is shown with a self-contained water supply, the fluid line 160 could be connected directly to a water supply line and controlled by means of a solenoid valve or the like.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A steam heating device for heating and freshening foodstuffs comprising:
   a cabinet,
   a heat exchanger assembly mounted in said cabinet and having an upper surface,
   a lid connected to said cabinet and enclosing the upper surface of said heat exchanger assembly to form therewith a food compartment adapted for receiving foodstuffs to be heated,
   said heat exchanger assembly including a steam generating chamber below the food compartment and having a lower surface, heating element means directly under said chamber for heating the lower surface thereof, and nozzle means for directing water into said chamber on the lower surface thereof, said steam generating chamber lower surface being a substantially flat, continuous surface unobstructed by barriers thereon so that water injected into the steam generating chamber can flow to substantially all areas thereof,
   said heat exchanger assembly further including two steam superheating chambers each having a lower surface, the total combined surface area of said steam superheating chambers lower surfaces being much smaller than the surface area of said steam generating chamber lower surface, said generating and superheating chambers communicating through respective throttling passages each having a cross-sectional flow area less than the cross-sectional flow area of the respective superheating chambers in said steam generating chamber, whereby the steam increases in velocity as it enters the throttling passage from the steam generating chamber and expands upon entering the superheating chambers from the throttling passages,
   narrow, elongated connecting passages respectively connected directly to said superheating chambers so that steam leaving said superheating chambers directly enters the respective connecting passages, said connecting passages having cross-sectional flow areas that are smaller than the cross sectional flow areas of the respective superheating chambers, and
   a plurality of small outlet passages in said heat exchanger assembly connected to said connecting passages and opening into said food compartment, whereby superheated steam is introduced into the food compartment to heat and freshen the foodstuffs therein, said throttling passage including an inlet opening into the generating chamber, and said heat exchanger assembly comprising two barrier means positioned respectively between said nozzle and the inlets to said throttling passages to form tortuous paths for the steam produced in said generating chamber and prevent water droplets from directly entering the superheating chambers.

2. The device of claim 1 wherein said throttling passages include portions that are tapered in the direction of flow of the steam therethrough.

3. The device of claim 1 wherein said heat exchanger assembly includes an upstanding lip extending above said upper surface of said heat exchanger assembly, and said outlet passages open into said food compartment from said lip.

4. The device of claim 3 wherein said lip and output passages are on opposite sides of said food compartment with the outlet passages on one side of the compartment being connected to one of the superheating chambers and the outlet passages on the other side of the compartment being connected to the other superheating chamber through the respective connecting passages.

5. The device of claim 1 including a removable tray received in said compartment and said lip at least partially encircles said tray.

6. The device of claim 1 wherein said means for heating the lower surface comprises an electric heating element.

7. The device of claim 1 wherein said heat exchanger assembly comprises: a first plate, a second plate below said first plate, means for vertically connecting said first and second plates together, an electric heating element embedded in said second plate, said heat exchanger assembly upper surface is an upper surface of said first plate, said first and second plates have respective surfaces in facing arrangement which form said generating and superheating chambers and said throttling passage.

8. The device of claim 7 wherein said cabinet includes an opening and said heat exchanger plates are supported by said cabinet in said cabinet opening, and said lid is pivotally connected to said cabinet.

9. The device of claim 1 including a water supply tank and a pump means for pumping water from said supply tank to said nozzle means.

10. The device of claim 9 wherein said pump means comprises a pair of serially connected duckbill valves communicating with an expansible chamber interposed between the valves, and means for selectively contracting and expanding said expansible chamber.

11. The device of claim 1 wherein said cabinet comprises an opening in which said heat exchanger assembly is received, said lid is pivotally connected to said cabinet and includes an upper surface, and including a water supply tank positioned laterally adjacent said heat exchanger assembly and a pump positioned laterally adjacent the heat exchanger assembly and water tank, said cabinet enclosing said tank and pump, and said pump including an actuator protruding upwardly out of an upper surface of said cabinet, said cabinet and lid upper surface being coplanar when the lid is closed.

12. A steam heating device according to claim 1 including a water supply tank, and a pump interposed between the tank and nozzle means comprising a pump body having an inlet connected to the tank and an outlet connected to the nozzle, an expansible chamber interposed between said inlet and outlet, a first duckbill check valve received in said pump body and interposed between said inlet and said expansible chamber, and a second duckbill check valve received in said pump body and interposed between said expansible chamber and said outlet, said valves being oriented serially.

13. The device of claim 12 wherein said expansible chamber comprises a bellows and manually operated actuator means mounted in said cabinet for depressing said bellows, and said actuator means protrudes out of said cabinet.

14. The device of claim 13 wherein said actuator means comprises a sleeve mounted to said cabinet and an operator button slidably received in said sleeve and in engagement with said bellows.

15. The device of claim 12 wherein said pump body inlet is oriented orthogonally to said pump body outlet.

16. The device of claim 12 wherein said nozzle means includes a check valve therein.

17. A steamheating device for heating and freshening foodstuffs comprising:
a cabinet,
a heat exchanger assembly mounted in said cabinet and having an upper surface,
a lid connected to said cabinet and enclosing the upper surface of said heat exchanger assembly to form therewith a food compartment adapted for receiving foodstuffs to be heated,
said heat exchanger assembly including a steam generating chamber below the food compartment having a lower surface, means below said chamber for heating the lower surface thereof, and nozzle means for directing water into said chamber on the lower surface thereof,
said heat exchanger assembly further including a steam superheating chamber substantially coplanar with said steam generating chamber and being of a smaller volume than said steam generating chamber, said generating and superheating chambers communicating through a throttling passage having a cross-sectional flow area less than the cross-sectional flow areas of each of said superheating chamber and said steam generating chamber, whereby the steam increases in velocity as it enters the throttling passage from the steam generating chamber and expands upon entering the superheating chamber from the throttling passage, and
a plurality of small outlet passages in said heat exchanger assembly in communication with said superheating chamber and opening into said food compartment, whereby superheated steam is introduced into the food compartment to heat and freshen the foodstuffs therein,
said heat exchanger assembly including an upstanding lip extending above said upper surface of said heat exchanger assembly, and said outlet passages open into said food compartment from said lip, said lip being on substantially the periphery of said food compartment.

18. A steam heating device for heating and freshening foodstuffs comprising:
a cabinet,
a heat exchanger assembly mounted in said cabinet and having an upper surface,
a lid connected to said cabinet and enclosing the upper surface of the heat exchanger assembly to form therewith a food compartment adapted for receiving foodstuffs to be heated,
said heat exchanger assembly including a steam generating chamber below the food compartment, said steam generating chamber having a lower surface, heating element means directly under said chamber and in thermal contact with said lower surface for heating the lower surface, and nozzle means for directing water into said chamber directly onto the lower surface thereof, said heat exchanger assembly further including a steam superheating chamber having a lower surface, the total surface area of said steam superheating chamber lower surface being much smaller than the surface area of said steam generating chamber lower surface, said generating and superheating chamber communicating through a throttling passage having a cross-sectional flow area less than the cross-sectional flow area of each of said superheating chamber and said steam generating chamber, whereby the steam increases in velocity as it enters the throttling passage from the steam generating chamber and expands upon entering the superheating chamber from the throttling passage, said throttling passage including a portion that is tapered in the direction of flow of the steam therethrough and the cross-sectional flow area decreases in said tapered direction, and a plurality of small outlet passages in said heat exchanger assembly in communication with said superheating chamber and opening into said food compartment, whereby superheated steam is introduced into the food compartment to heat and freshen the foodstuffs therein.

* * * * *

UNITED STATES PATENT AND TRADEMARK OFFICE
CERTIFICATE OF CORRECTION

PATENT NO. : 4,495,932

DATED : January 29, 1985

INVENTOR(S) : Ronald E. Bratton

It is certified that error appears in the above-identified patent and that said Letters Patent is hereby corrected as shown below:

Column 5, line 40, insert --inlet-- after "water".

Column 5, line 48, insert --such-- after "any".

Column 7, line 37, change "175" to --176--.

Column 9, line 17, claim 4, change "output" to --outlet--.

Signed and Sealed this

Twenty-eighth Day of May 1985

[SEAL]

Attest:

DONALD J. QUIGG

Attesting Officer     Acting Commissioner of Patents and Trademarks